R. J. ALTGELT.
CULTIVATOR.
APPLICATION FILED FEB. 26, 1915.
1,229,010.
Patented June 5, 1917.
3 SHEETS—SHEET 1.
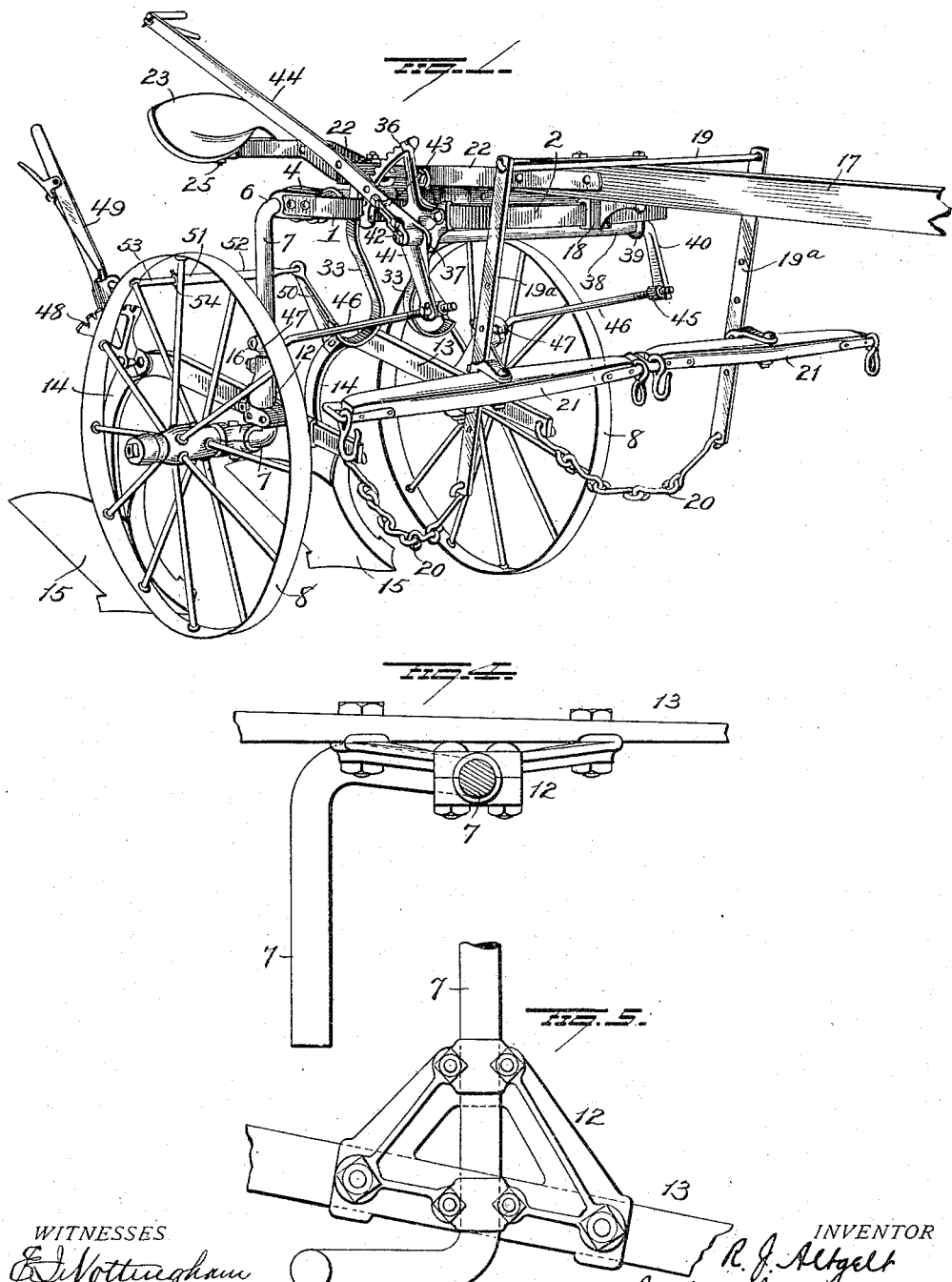

R. J. ALTGELT.
CULTIVATOR.
APPLICATION FILED FEB. 26, 1915.
1,229,010.
Patented June 5, 1917.
3 SHEETS—SHEET 2.
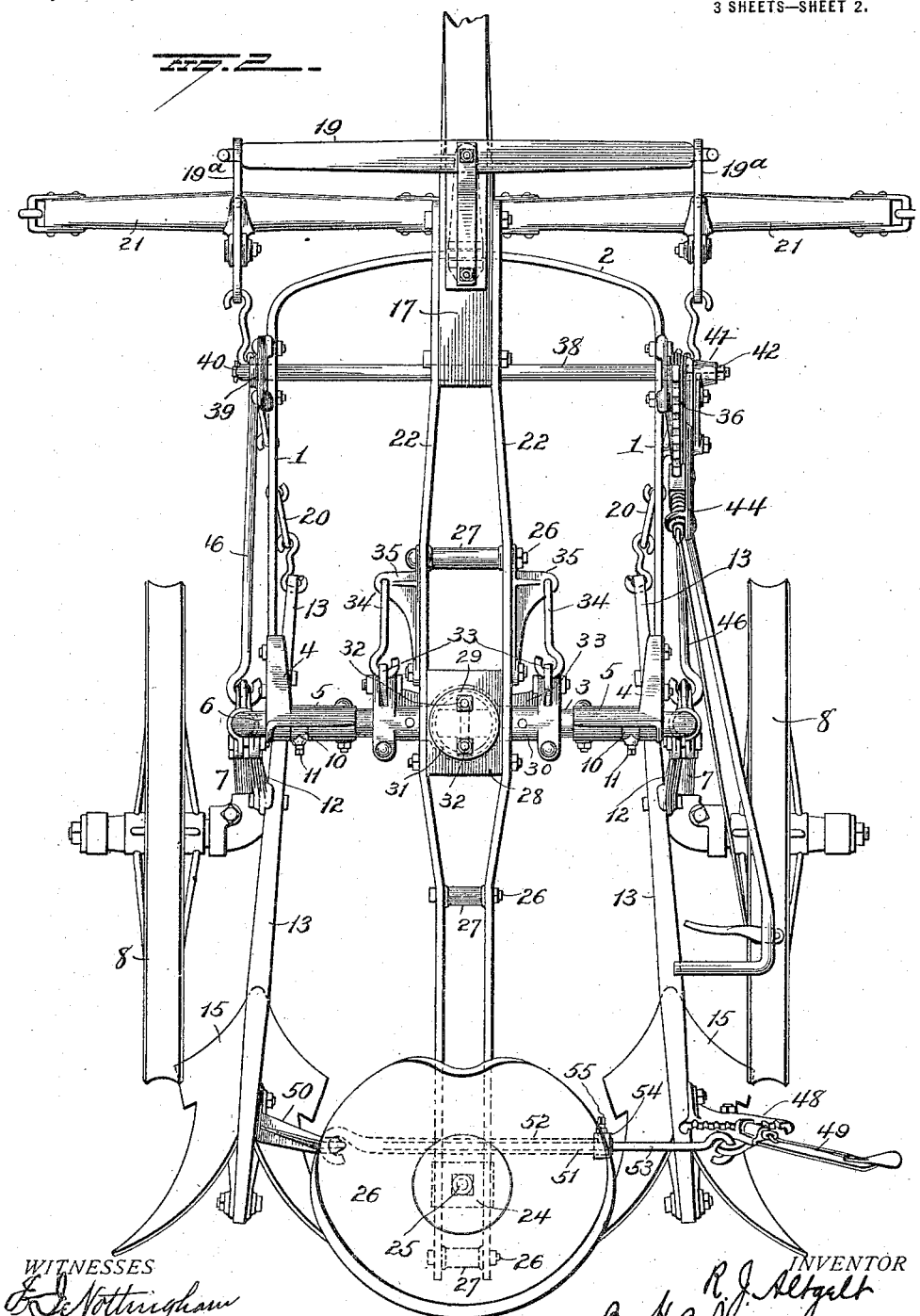
WITNESSES
INVENTOR
R. J. Altgelt
By H. G. Seymour
Attorney

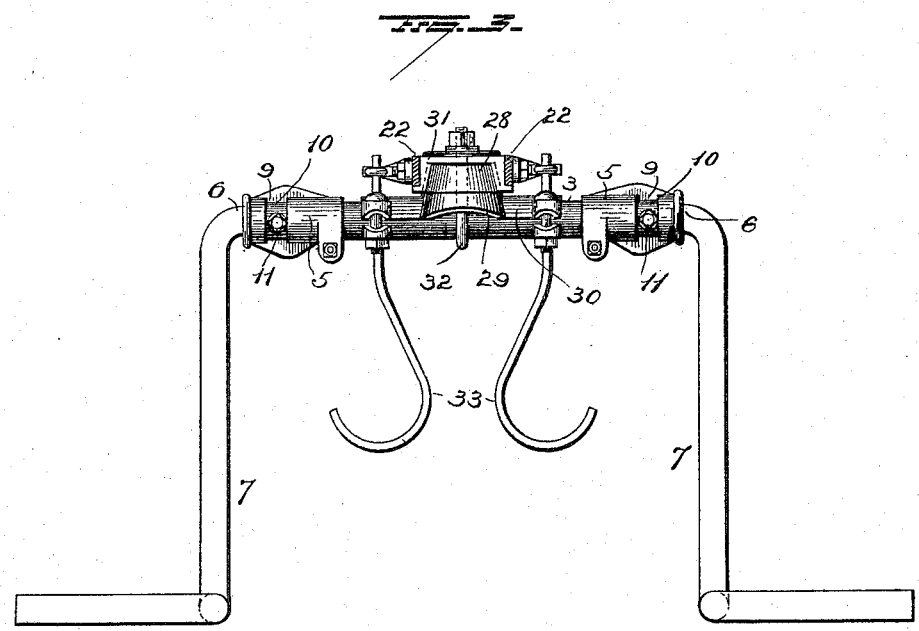

UNITED STATES PATENT OFFICE.

RUDOLPH J. ALTGELT, OF BUENOS AIRES, ARGENTINA, ASSIGNOR TO OLIVER CHILLED PLOW WORKS, OF SOUTH BEND, INDIANA.

CULTIVATOR.

1,229,010. Specification of Letters Patent. Patented June 5, 1917.

Application filed February 26, 1915. Serial No. 10,786.

*To all whom it may concern:*

Be it known that I, RUDOLPH J. ALTGELT, a citizen of the United States, residing at Buenos Aires, Argentina, have invented certain new and useful Improvements in Cultivators; and I do hereby declare the following to be a full, clear, and exact description of the invention, such as will enable others skilled in the art to which it appertains to make and use the same.

This invention relates to improvements in cultivators,—one object of the invention being to simplify and improve raising and lowering means for the beams, and to so construct the mechanism that the frame will be automatically balanced when the beams are either raised or lowered.

A further object is to facilitate lateral adjustment of the beams and plow bases to vary the distance between the latter.

A further object is to provide simple and efficient means for changing alinement of the main frame and plow bases relatively to the movement of the tongue, whereby the plow bases may be held in correct position on the row when the team is not central over the row.

With these and other objects in view, the invention consists in certain novel features of construction and combinations of parts as hereinafter set forth and pointed out in the claims.

In the accompanying drawings, Figure 1 is a view of a cultivator embodying my improvements; Fig. 2 is a plan view; Fig. 3 is a rear view partly in section, showing the mounting of the seat bars, and Figs. 4 and 5 are views of details of construction.

The main frame of the machine comprises side bars 1—1; a forward curved cross bar 2 and a rear cross bar 3, the latter being rigidly connected with the side bars of the frame, through the medium of brackets 4. The portions 5 of the brackets 4 are made tubular in form and are rigidly secured to the ends of the rear cross bar 3. The tubular portions 5 of the brackets 4 constitute bearing for the upper arms 6 of crank axle members 7, the lower or spindle portions of the latter being mounted in the hubs of carrying wheels 8. It will be observed that the axle members 7 and cross bar together with the tubular portions 5 of the brackets 4, constitute an arch axle. The tubular portions of the brackets 4 are made with slots 9 for the accommodation of a collar 10 secured by set screws 11 to the upper arms 6 of the crank axle members. By these means, the crank axle members may be adjustably mounted in the bracket members 5, so as to permit said axle members and the parts connected therewith to be adjusted laterally. Brackets 12 are loosely or pivotally mounted upon the upright members of the crank axle members so as to be capable of swinging horizontally thereon, and these brackets are secured to cultivator beams 13 rearwardly of the forward ends of the latter. The rear ends of the beams 13 may be curved downwardly to form standards 14 to which the plow bodies 15 are suitably secured. Vertical displacement of the brackets 12 on the axle members will be prevented by clamps or stops 16 secured to latter above said brackets.

A tongue 17 projects over and rearwardly past the front cross bar 2 of the frame and is provided with a guide 18 mounted to embrace said cross bar and permit the latter to have a free sliding movement relatively to the tongue, as hereinafter more fully described.

An evener bar 19 is pivotally mounted on the tongue in advance of the connection of the latter with the frame and to the respective ends of this bar, depending equalizer bars 19ª are loosely attached, the lower ends of said depending bars being connected with the forward ends of the beams 13 by means of chains 20. Swingle-trees 21 are adjustably connected with the respective bars 19ª.

The forward ends of seat bars 22 are rigidly secured to the rear end of the tongue 17,—said seat bars extending rearwardly over the rear cross bar of the frame and terminating approximately over the horizontal planes occupied by the plow bases. A seat 23 is mounted on the rear ends of the seat bars and is adjustably secured to the latter by means of a clamping plate 24 and a bolt 25. The seat bars are connected at intervals by means of bolts 26 and are held properly spaced by means of sleeves 27 on said bolts. The intermediate portions of the seat bars are spaced farther apart than are the end portions and are securely bolted to respective sides of a hollow block or casting 28, the interior of which is partly spherical in form and is pivotally mounted upon the partly spherical portion 29 of a casting 30 clamped to the central axle section or cross bar 3. The pivotal mounting for the seat bars, thus formed, is retained properly assembled by means of a plate 31 resting upon the block or casting 28 and a U-bolt 32ª secured to said plate and embracing the cross bar or central axle section 3, as shown in Fig. 3.

The casting 30 is provided at its respective ends with pairs of lugs 32, and to these lugs, foot levers 33 are pivotally supported near their upper ends. To the upwardly projecting arms of these foot levers, the rear ends of links 34 are loosely connected, the forward ends of said links being loosely connected with brackets 35 secured to and projecting laterally from the respective seat bars.

It is apparent that if one or the other of the foot levers be moved on its pivotal mounting, the frame will be swung laterally relatively to the tongue,—said frame turning on the pivotal mounting between the seat bars and the rear end of the frame,—and as the rear cross bar of the frame also constitutes the central member of an arch axle to which the cultivator beams are attached, said cultivator beams will also be shifted relatively to the tongue and seat bars, thus enabling the operator to hold the plow or cultivator bodies in correct positions with relation to the row when the team is not central over the row.

To one of the side bars of the frame, near the forward end thereof, a toothed segment 36 is secured, and the lower portion of the frame of this segment which projects below the frame bar 2 to which it is secured, affords a bearing 37 for a transversely disposed shaft 38,—the other bearing for said shaft being provided at the lower end of a bracket 39 secured to the opposite frame bar 1. At this end of the shaft 38, a crank arm 40 depends therefrom, and the other end of the shaft projects beyond its bearing in the frame of segment 36 and is made angular for the reception of an arm 41 having an angular opening therein,—said arm 41 being held in place by a suitable nut 42. The arm 41 is made with an extension 43 which projects upwardly and rearwardly therefrom, and to said extension, the lower end of an operating lever 44 is secured, said lever being provided with a suitable detent to engage the toothed segment and with a finger bar to operate said detent. Internally threaded sleeves 45 are pivotally attached to the depending arms 40—41 of the shaft 38, at or near the free ends of said arms, and through these sleeves, the forward threaded ends of rods 46 pass. The rear ends of said rods are pivotally connected with the crank axle members 7,—the clamps or stops 16 being provided with eyes 47 to receive the hooked rear ends of the rods to effect such pivotal connection. By adjustably connecting the forward ends of the rods 46 with the arms of the rock shaft 38, each of the cultivator beams may be adjusted forwardly or backwardly and thus the cultivator bodies may be set properly with relation to each other.

With the construction and arrangement of parts as above described, it will be apparent that by moving lever 44 upwardly and forwardly, motion will be imparted through the arms 40—41 of the rock shaft 38 and the rods 46 to the crank axle members 7, which will cause the wheels 8 to be shifted to the rear of the pivotal mountings of the crank axle members on the frame 1, and as the beams 13 are attached to said crank axle members, said beams and the plow or cultivator bodies will be raised, and at the same time the machine will be so balanced automatically that the front end of the tongue will not raise when the plow bodies are raised. When the lever is lowered, the crank axle members will be moved forwardly and the plow or cultivator bodies lowered to working position, when the upright portions of the crank axle members will be nearly vertical. The cultivator will be so automatically balanced when the plow or cultivator bodies are lowered to working position that there will be no "neck-weight" on the neck yokes while the machine is at work.

It has been hereinbefore explained how the beams are so connected with the upright portions of the crank-axle members that they may have a horizontal swinging movement imparted to them. This will enable such adjustment of the beams that the plow bodies may be moved laterally, and also adjusted relatively to each other, so that the cultivator may be made adaptable for cultivating rows of different widths,—for instance, rows of from 24 to 30 inches in width. Such adjustment for width is also facilitated by the fact that the beams are attached to the crank-axle members which are laterally adjustable by reason of the longitudinal adjustability of their upper arms with relation to the upper arch axle members or cross bar, as previously explained.

For the purpose of swinging the beams horizontally on their pivotal connections with the crank-axle members, the devices now to be described are employed.

A toothed segment 48 is secured to one of the beams 13 and to the frame of this segment, a hand lever 49 is pivoted and provided with the usual manually operable detent to engage the teeth of the segment. An upwardly projecting arm 50 is secured to the other beam 13, and an adjustable connecting rod 51 connects this arm with the lever 49. The connecting rod 51 comprises two telescoping members 52—53 to permit the longitudinal adjustment of said rod and the member 52 is provided with a collar 54 through which a set screw 55 passes and engages the member 53 to hold the two members at the desired adjustment. By making the connecting rod 51 extensible, the lateral adjustment of the beams effected by the lateral adjustment of the crank-axle members as above explained, will be facilitated.

When the lever 49 is operated, motion will be imparted to swing the beams horizontally on their pivotal connections with the vertical portions of the crank-axle members, and the plow bodies may be adjusted laterally to change the distance between them and be brought nearer to or farther from the plants by moving the lever 49 relatively to the segment 48, while the cultivator is in operation.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a wheeled cultivator, the combination with a frame, arch axle members, and wheels, of cultivator beams attached directly to and supported by the upright portions of said arch axle members, a rock shaft mounted on the frame and provided with arms, connections between each of said arms and the upright portions of the respective arch axle members, an operating lever secured to said rock shaft, and means for locking said lever.

2. In a wheeled cultivator, the combination with a frame, crank axle members separately mounted on said frame, and wheels receiving the journal portions of said crank axle members, of a beam attached directly to and supported by the upright portion of each crank axle member, a rock-shaft provided with arms, rods connected with the respective crank-axle members, adjustable connections between each of said rods and one of the arms of the rock-shaft, and means for operating said rock shaft.

3. In a wheeled cultivator, the combination with a frame, wheels, and an arch axle comprising separately mounted crank-axle members, of beams attached to the upright portions of said crank-axle members, a rock shaft provided with arms, interiorly threaded sleeves pivoted to said arms, rods connected with the crank-axle members and having threaded forward ends passing through said pivoted sleeves, and means for operating said rock shaft.

4. In a wheeled cultivator, the combination with a frame and wheels, of an arch axle comprising a central member constituting a fixed part of the frame and two crank-axle members having journals mounted in the hubs of said wheels, beams attached directly to the upright portions of said crank axle members, and means for adjusting said crank axle members laterally.

5. In a wheeled cultivator, the combination with a frame, wheels, and crank axle members mounted on said frame and having journal members mounted in the hubs of said wheels, of beams pivotally connected directly with the upright portions of the axle members near the lower ends of the latter and extending forwardly beyond such pivotal connection, and draft devices connected with the forward ends of said beams.

6. In a wheeled cultivator, the combination with a frame, wheels, an axle, beams attached to said axle, and a tongue, of seat bars secured at their forward ends to the rear end of the tongue and extending rearwardly past the frame, a seat on said seat bars, a pivotal mounting between the rear end of the frame and intermediate portions of the seat bars, and lever mechanism for shifting the frame, axle and beams on said pivotal mounting between the frame and seat bars.

7. In a wheeled cultivator, the combination with a frame having a curved forward end, beams attached to said axle, and a tongue, of guiding means for the tongue on the curved forward end of the frame, seat bars pivotally mounted between their ends on the rear end of the frame, a seat on the rear ends of said seat bars, foot levers pivotally mounted on the rear portion of the frame, and link connections between said foot levers and the seat bars.

8. In a wheeled cultivator, the combination with a frame, wheels, an axle, a tongue at the forward end of the frame, and beams attached to the axle, of seat bars pivotally mounted between their ends on the rear end of the frame and secured at their forward ends to the tongue, a seat on the rear ends of said seat bars, foot levers pivoted to the rear portion of the frame, brackets projecting laterally from the seat bars forwardly of their pivotal mounting, and connections between said brackets and the foot levers.

9. In a wheeled cultivator, the combination with a frame, wheels, an axle, beams attached to the axle, and a tongue, of seat bars secured at their forward end to the tongue, a seat at the rear ends of said seat bars, a hollow bearing block having a partly spherical interior secured to the seat bars intermediate of their ends, a partly spherical member secured to the rear part of the frame and constituting a seat for said bearing block, a plate on said block, a bolt connecting said plate with the bar of the frame, and means for swinging the frame, axle and beams with respect to the seat bars and tongue.

In testimony whereof, I have signed this specification in the presence of two subscribing witnesses.

RUDOLPH J. ALTGELT.

Witnesses:
 ALFRED MOAG,
 G. BEHNKE.

Copies of this patent may be obtained for five cents each, by addressing the "Commissioner of Patents, Washington, D. C."